United States Patent [19]
Bates, Jr. et al.

[11] Patent Number: 6,038,841
[45] Date of Patent: Mar. 21, 2000

[54] DEVICE FOR LEVELING A MOWER DECK

[75] Inventors: Ray G. Bates, Jr., Kingston Springs; Robert M. Deweese, Jr.; John A. Burns, both of Franklin, all of Tenn.

[73] Assignee: Murray, Inc., Brentwood, Tenn.

[21] Appl. No.: 09/198,373

[22] Filed: Nov. 24, 1998

[51] Int. Cl.[7] .................................................. A01D 34/00
[52] U.S. Cl. ........................ 56/15.8; 56/15.6; 56/DIG. 22
[58] Field of Search ................... 56/15.8, 15.7, 56/15.9, 15.6, 16.7, DIG. 22, DIG. 3, DIG. 10, 320.1

[56] References Cited

U.S. PATENT DOCUMENTS

| | | | |
|---|---|---|---|
| 4,159,613 | 7/1979 | Knudson et al. | 56/11.3 |
| 4,760,687 | 8/1988 | Siegrist | 56/15.8 |
| 4,779,406 | 10/1988 | Schroeder | 56/15.9 |
| 4,869,057 | 9/1989 | Siegrist | 56/15.9 |
| 5,367,864 | 11/1994 | Ogasawara et al. | 56/15.8 |
| 5,381,648 | 1/1995 | Seegert et al. | 56/17.1 |
| 5,483,789 | 1/1996 | Gummerson | 56/15.5 |
| 5,528,886 | 6/1996 | Esau | 56/14.9 |
| 5,528,889 | 6/1996 | Kure et al. | 56/15.6 |
| 5,813,203 | 9/1998 | Peter | 56/17.2 |
| 5,927,055 | 7/1997 | Ferree et al. | 56/15.9 |
| 5,937,625 | 6/1997 | Seegert | 56/15.6 |

*Primary Examiner*—Thomas B. Will
*Assistant Examiner*—Arpad Fabian Kovacs
*Attorney, Agent, or Firm*—Pillsbury Madison & Sutro LLP

[57] ABSTRACT

An arrangement is provided for leveling the blade housing of a mower. The housing is suspended from the underside of a vehicle frame by a pair of suspension arms pivotally connected to the housing and the frame. A pair of brackets are joined to opposite sides of the housing, and a third bracket is joined to an end of the housing. An operator-controlled lift handle is connected to a rod pivotally connected to the frame. Three lift arms are joined to the rod so as to be displaced when the lift handle is actuated. First and second cables extend between respective ones of the pair of brackets, and a third cable extends between the third lift arm and the third bracket. The cables are selectively locked to their respective brackets. When the lift handle is activated to lower the housing to its maximum extent, unlocking of the cable permits the entire housing to settle on the ground. By tensioning the cables and then re-locking them to their respective brackets, actuation of the handle to lift the housing permits the housing to be raised in a level relationship to the ground.

11 Claims, 1 Drawing Sheet

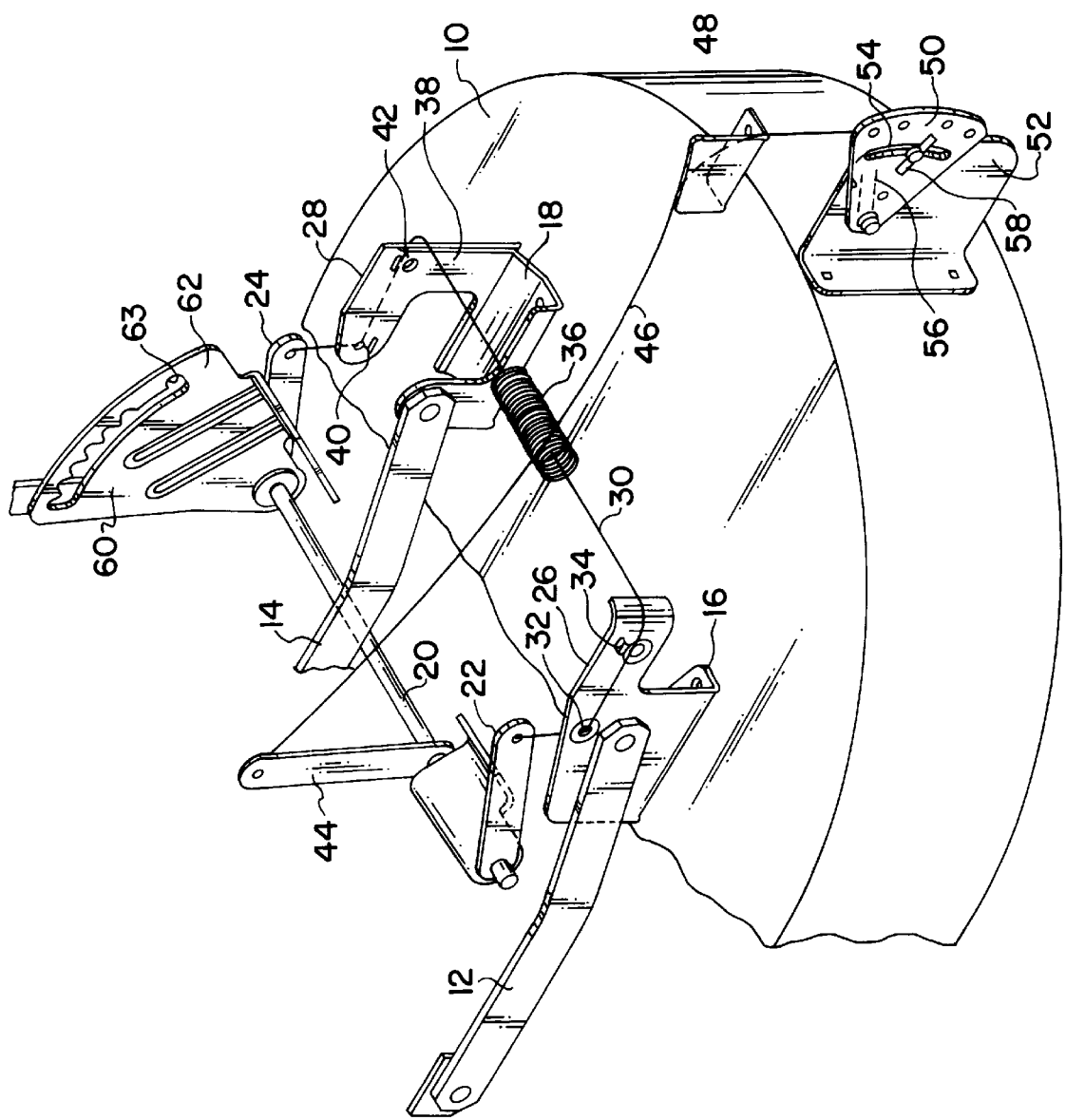

DEVICE FOR LEVELING A MOWER DECK

BACKGROUND OF THE INVENTION

1. Field of the Invention

The present invention relates to arrangement for adjusting the orientation of a blade housing which is suspended on the underside of a rider type mower.

2. The Prior Art

The use of a mower suspended in non-ground engaging relationship beneath the frame of a tractor or a rider type lawn mower is well known. In such arrangements the mower includes a housing for the mower's blade(s), the housing being linked to the frame of the vehicle. Such linkage typically is adjustable so that the height of the blade relative to the underlying terrain can be set selectively in order to achieve the desired cut.

An important consideration in obtaining proper cutting of vegetation over which the mower moves is that the blade-supporting housing be leveled so that the blade's cutting path is of uniform height from front to rear and from side to side. Known implements having means for orienting the blade housing so that it is appropriately suspended over the ground typically require tools for making adjustments in the housing's orientation. Additionally, the adjustment process often is complex and physically demanding whereby it is difficult, if not impossible, for many users to adjust the housing's orientation relative to the ground.

SUMMARY OF THE INVENTION

The present invention overcomes the shortcomings of conventional mower housing suspension arrangements by providing a toolless means to permit adjustment of the blade housing with a minimum requirement of skill and strength. More particularly, the housing is joined to the frame of the vehicle by a pair of suspension arms pivotally connected to the frame and to anchoring points on opposite sides of the housing. A rod is rotatably secured to the frame and extends substantially transversely to the longitudinal axes of the suspension arms. The rod supports a pair of spaced lift arms the free ends of which are connected via cables which are joined to respective ones of a pair of brackets which are mounted to the housing adjacent the anchoring points of the suspension arms. A third lift arm is secured to the rod intermediate the pair of lift arms. The free end of the third lift arm is connected to a cable which extends to a third bracket mounted at the front of the housing.

A lift handle is secured to the rod. When the handle is displaced to rotate the rod, the housing is raised and lowered by the aforesaid cables.

Adjustment means are provided at each of the three brackets to permit control of tension on the cables. With the handle displaced so as to lower the housing into contact with the ground, each adjustment means is loosened to release the cables allowing any remaining lower edge portion of the housing to adjust to ground level. At that point, tightening of the adjustment means secures the cables relative to the three brackets mounted to the housing whereby when the handle is displaced to elevate the housing, the housing, and the cutting blade supported therein are uniformally oriented above the ground.

BRIEF DESCRIPTION OF THE DRAWING

The invention now will be described in greater detail with respect to the accompanying drawing which is a perspective view of an arrangement for leveling a mower housing according to the present invention.

DETAILED DESCRIPTION OF A PREFERRED EMBODIMENT OF THE INVENTION

Although the present invention may be employed with a tractor, the following description is of its use in association with a rider type lawn mower.

Referring now to the drawing, a portion of a mower blade housing 10 is illustrated. It will be understood that a cutting blade (not shown) is mounted within housing 10 for rotation in a plane substantially parallel to the lower edge of housing 10. For convenience of illustration, the frame of the conventional mower, and the mechanisms for rotating the cutting blade, are omitted.

A pair of spaced suspension arms 12 and 14 are employed to join housing 10 to the frame of the mower. The clarity of illustration, only a portion of arm 14 is illustrated. It will be understood, however, that each arm is pivotally connected at one of its ends to the mower frame and to upwardly extending portions of respective brackets 16 and 18 secured to the top of housing 10 on opposite sides of the housing substantially along the transverse centerline of the housing.

A rod 20 is pivotally connected to the mower frame. The longitudinal axis of the rod extends transversely to the frame in a direction substantially parallel to the transverse centerline of housing 10. A pair of spaced lift arms 22 and 24 are secured to rod 20. Arms 22 and 24 are substantially aligned with upwardly projecting portions 26 and 28 of respective brackets 16 and 18.

A first cable 30 extends from the free end of arm 22 past a cable guide 32 and a clamp 34, both mounted on projecting bracket portion 26, to one end of a spring 36. Although not specifically illustrated, clamp 34 preferably comprises an adjustable locking knob which, when in its locking position, clamps cable 30 against portion 26 to prevent cable movement relative to bracket 16.

A second cable 38 extends from the free end of arm 24 past a cable guide 40 and a clamp 42, both mounted on projecting bracket position 28, to the opposite end of spring 36. Again, although not specifically illustrated, clamp 42 is of the same type as clamp 34 and functions in the same manner so as to selectively clamp cable 38 against portion 28 to prevent cable movement relative to bracket 18.

A third lift arm 44 is connected to rod 20 intermediate lift arms 22 and 24. A third cable 46 extends from the free end of arm 44 through a frame-mounted cable guide 48 to an adjusting plate 50 which is pivotally connected to a bracket 52 joined to the front of housing 10 in substantial alignment with the fore-to-aft centerline of the housing. Plate 50 is provided with an arcuate slot 54, the radius of which is the distance to the pivotal connection of plate 50 to bracket 52. A spring 56 extends between plate 50 and bracket 52 to urge the plate to pivot relative to the bracket so as to tension cable 46.

A threaded pin, connected at one of its ends to bracket 52, passes through slot 54. The pin is provided at its free end with an adjustable locking knob 58 which when tightened against a friction pad (not shown) clamps plate 50 against bracket 52 to prevent relative movement therebetween.

A lift handle 60 is secured to rod 20. Handle 60 is associated with a detent plate 62 mounted to the frame of the mower whereby handle 60 can be moved between various detents in plate 62.

When handle 60 is displaced relative to plate 62, such movement is translated by lift arms 22, 24 and 44, and by respective cables 30, 38 and 46, so as to raise or lower the housing depending on the direction of the handle's movement.

The structure of device having been described, the manner of performing toolless adjustment of the mower housing's position relative to the ground now will be described.

Handle 60 is displaced to the leveling detent position 63 of plate 62. At that point, clamps 34, 42 and 58 are loosened so as to allow the housing to fully settle on the ground. When the housing is so positioned, spring 36 tensions cables 30 and 38, and spring 56 pivots plate 50 to tension cable 46. The clamps 34, 42 and 58 are then tightened whereby when handle 60 is actuated to raise housing 10, the housing rises uniformly from the ground whereby the cutting blade within the housing is able to rotate in a plane parallel to the ground.

The arrangement which has been described permits fore-to-aft and side-to-side leveling of housing 10 without the necessity of tools. The suspension arms 12 and 14 carry the loads of the blade drive mechanism, while the cables 30, 38 and 46 carry only the normal load of the housing 10. This minimizes the clamping force needed to sustain the level alignment of the housing whereby a person can easily hand-tighten the clamps 34, 42 and 58. Moreover, the compactness of the present housing support and leveling arrangement permits the invention to be used with smaller housings than is possible with conventional housing lifting and suspension arrangements

What is claimed is:

1. An arrangement for leveling a blade housing of a mower, the housing during operation of the mower being suspended from the underside of a vehicle frame in non-engaging relationship with ground over which said vehicle moves, comprising:

a pair of spaced suspension arms pivotally connected to respective opposite sides of said housing and to said frame;

a pair of spaced brackets joined to respective opposite sides of said housing;

a rod extending between opposite sides of said frame and being pivotally connected thereto;

a pair of spaced lift arms each connected at one of its ends to said rod;

a third lift arm connected at one of its ends to said rod at a location intermediate said pair of spaced lift arms;

a handle connected to said rod for rotating the rod when said handle is displaced thereby displacing opposite ends of the lift arms;

a first cable extending from the opposite end of one of said pair of lift arms to one of said brackets;

a second cable extending from the opposite end of the other of said pair of lift arms to the other of said brackets;

locking means associated with each of said brackets for selectively securing the first and second cables to respective brackets;

a third cable extending from the opposite end of said third lift arm to a third bracket joined to a front or rear portion of said housing; and additional locking means associated with said third bracket for selectively securing the third cable to said third bracket.

2. A blade housing leveling arrangement according to claim 1, wherein said suspension arms are pivotally connected to respective ones of said pair of spaced brackets.

3. A blade housing leveling arrangement according to claim 1, wherein said first and second cables have ends extending beyond the respective locking means for each cable, the cable ends being joined to opposite ends of a spring for tensioning the cables when the cables are not secured to their respective brackets by the locking means.

4. A blade housing leveling arrangement according to claim 3, wherein said suspension arms are pivotally connected to respective ones of said pair of spaced brackets.

5. A blade housing leveling arrangement according to claim 1, further comprising a plate pivotally connected to said third bracket, said third cable being connected to said plate.

6. A blade housing leveling arrangement according to claim 5, further comprising a spring interconnecting the plate and said third bracket for pivoting the plate relative to the third bracket to tension the third cable when the third cable is not secured to the third bracket.

7. A blade housing leveling arrangement according to claim 6, wherein said first and second cables have ends extending beyond the respective locking means for the first and second cables, the cable ends being joined to opposite ends of an additional spring for tensioning the first and second cables when they are not secured to their respective brackets.

8. A blade housing leveling arrangement according to claim 5, wherein said plate includes an arcuate slot having a radius centered at the pivotal connection between the plate and the third bracket, and wherein said additional locking means for the third cable includes a pin attached to the third bracket and passing through the slot to receive a locking knob mounted on a threaded end of the pin.

9. A blade housing leveling arrangement according to claim 8, further comprising a spring interconnecting the plate and said third bracket for pivoting the plate relative to the third bracket to tension the third cable when the third cable is not secured to the third bracket.

10. A blade housing leveling arrangement according to claim 9, wherein said first and second cables have ends extending beyond the respective locking means for the first and second cables, the cable ends being joined to opposite ends of an additional spring for tensioning the first and second cables when they are not secured to their respective brackets.

11. A blade housing leveling arrangement according to claim 10, wherein said suspension arms are pivotally connected to respective ones of said pair of spaced brackets.

* * * * *